United States Patent [19]
Wells

[11] 3,830,131
[45] Aug. 20, 1974

[54] HORIZONTAL BAND SAW BLADE GUARD STRUCTURE

[75] Inventor: Lane T. Wells, Three Rivers, Mich.

[73] Assignee: W. F. Wells and Sons, Inc., Three Rivers, Mich.

[22] Filed: June 25, 1973

[21] Appl. No.: 373,271

[52] U.S. Cl. .................... 83/820, 83/814, 83/546
[51] Int. Cl. ........................................... B23d 53/02
[58] Field of Search ............ 83/544, 545, 546, 814, 83/820, 397.1

[56] References Cited
UNITED STATES PATENTS
2,538,456  1/1951  Howe, Jr. ..................... 83/544 X
2,749,951  6/1956  Tetzner ........................ 83/545

*Primary Examiner*—J. M. Meister
*Attorney, Agent, or Firm*—Gordon W. Hueschen

[57] ABSTRACT

A horizontal-type band saw having a drive wheel and a support wheel mounted on a base, and a saw blade supported on the wheels, a work support member, and horizontally adjustable substantially vertically positioned guide means mounted one on each side of the work support member, each having a recess for receiving and guiding a portion of the saw blade in a vertical cutting position, and elongate channel-form blade guards each affixed at one end to one of said vertical blade guides and having the saw blade disposed within the channels of the blade guards, the other ends of the blade guards telescoping into protective housings covering the drive and support wheels. In an improved form, the walls and bottom of the channelform blade guards are sufficiently spaced from the blade guides so that the blade may be removed from the guides and blade guards without disassembling the structure. In a further improved embodiment, a hinged cover is provided on the blade guard to cover the open channel during operation, and to be opened for removal of the saw blade.

7 Claims, 5 Drawing Figures

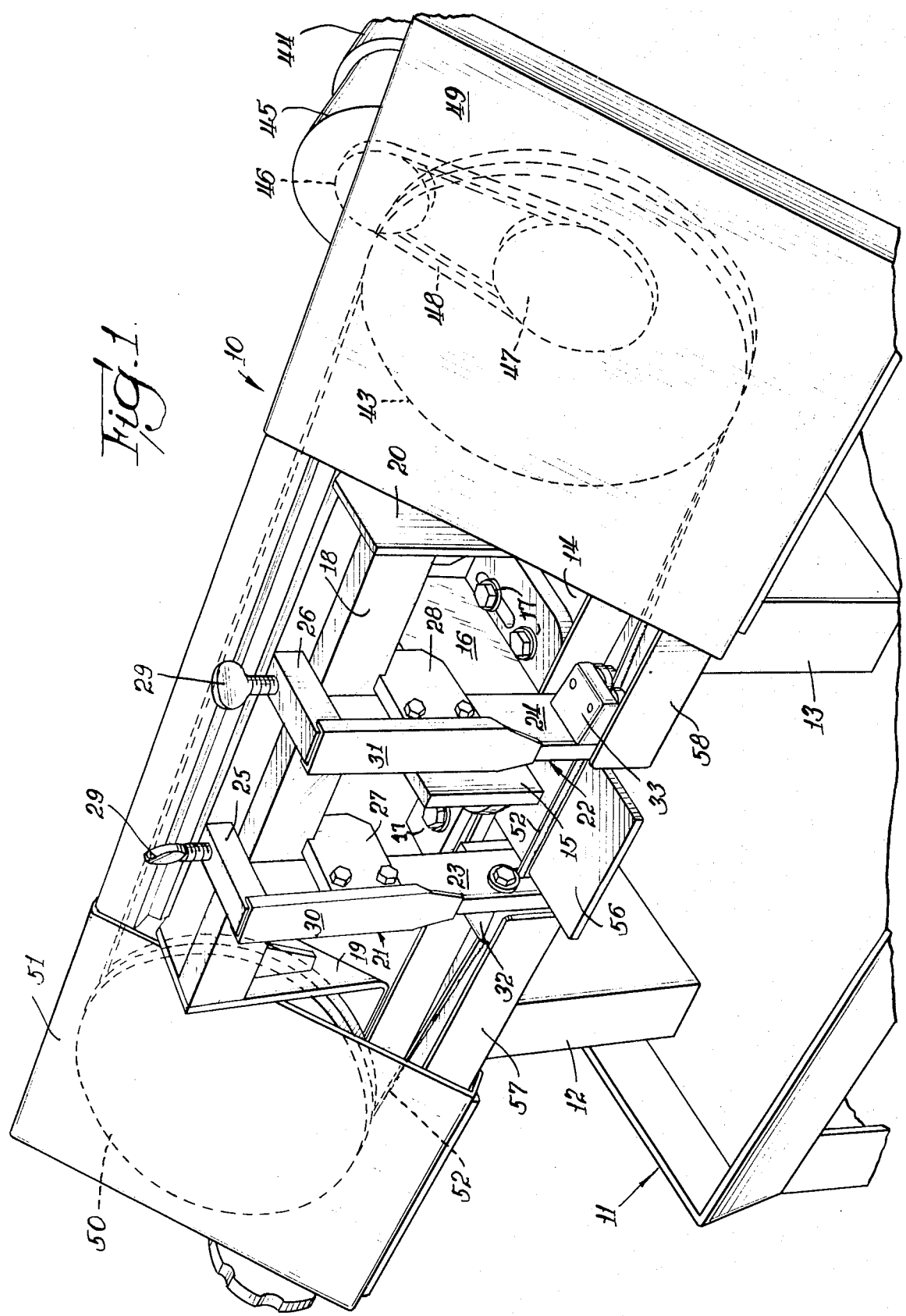

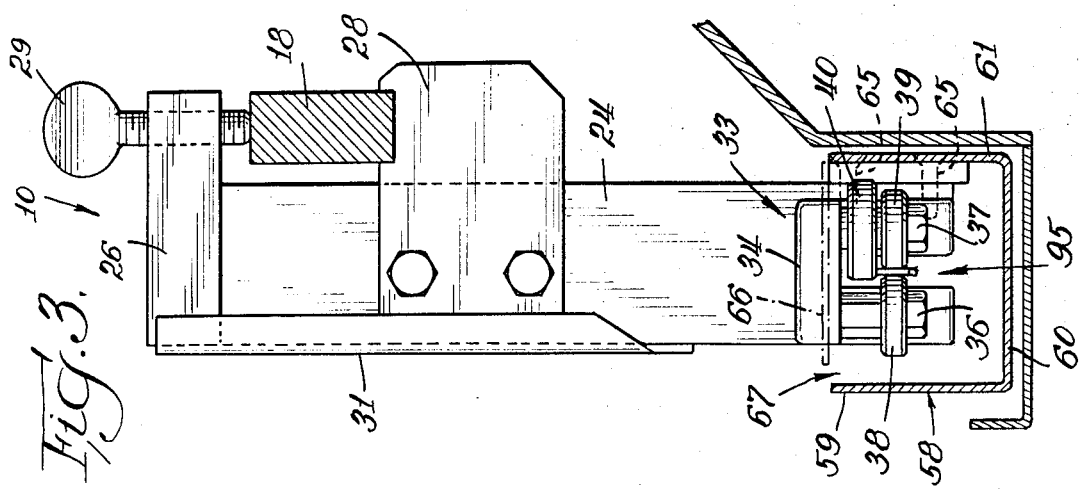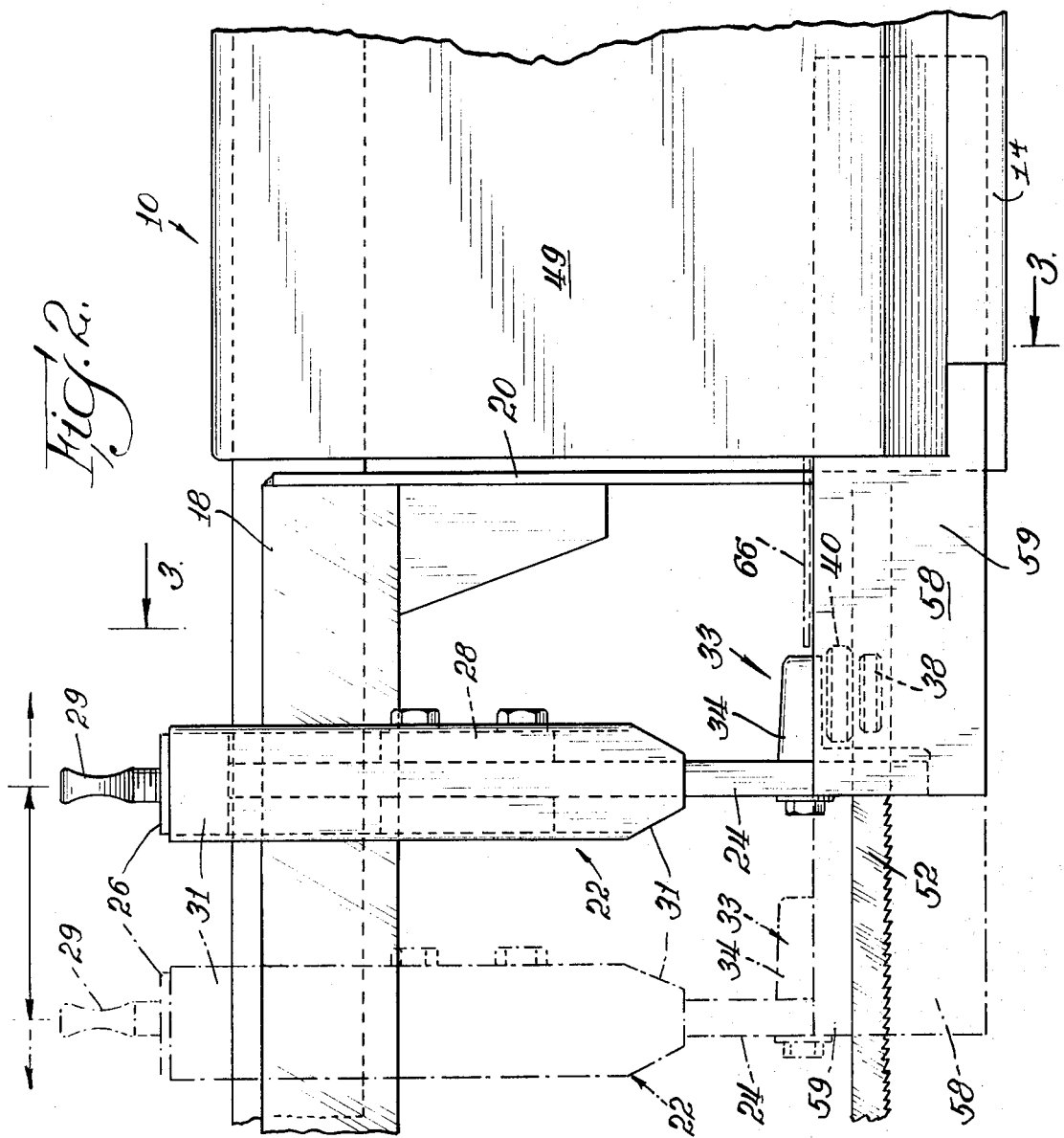

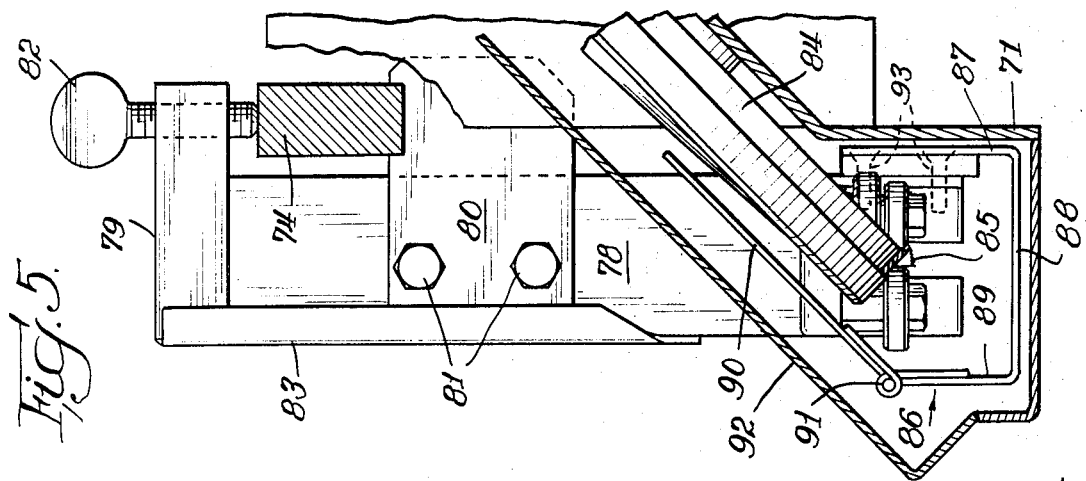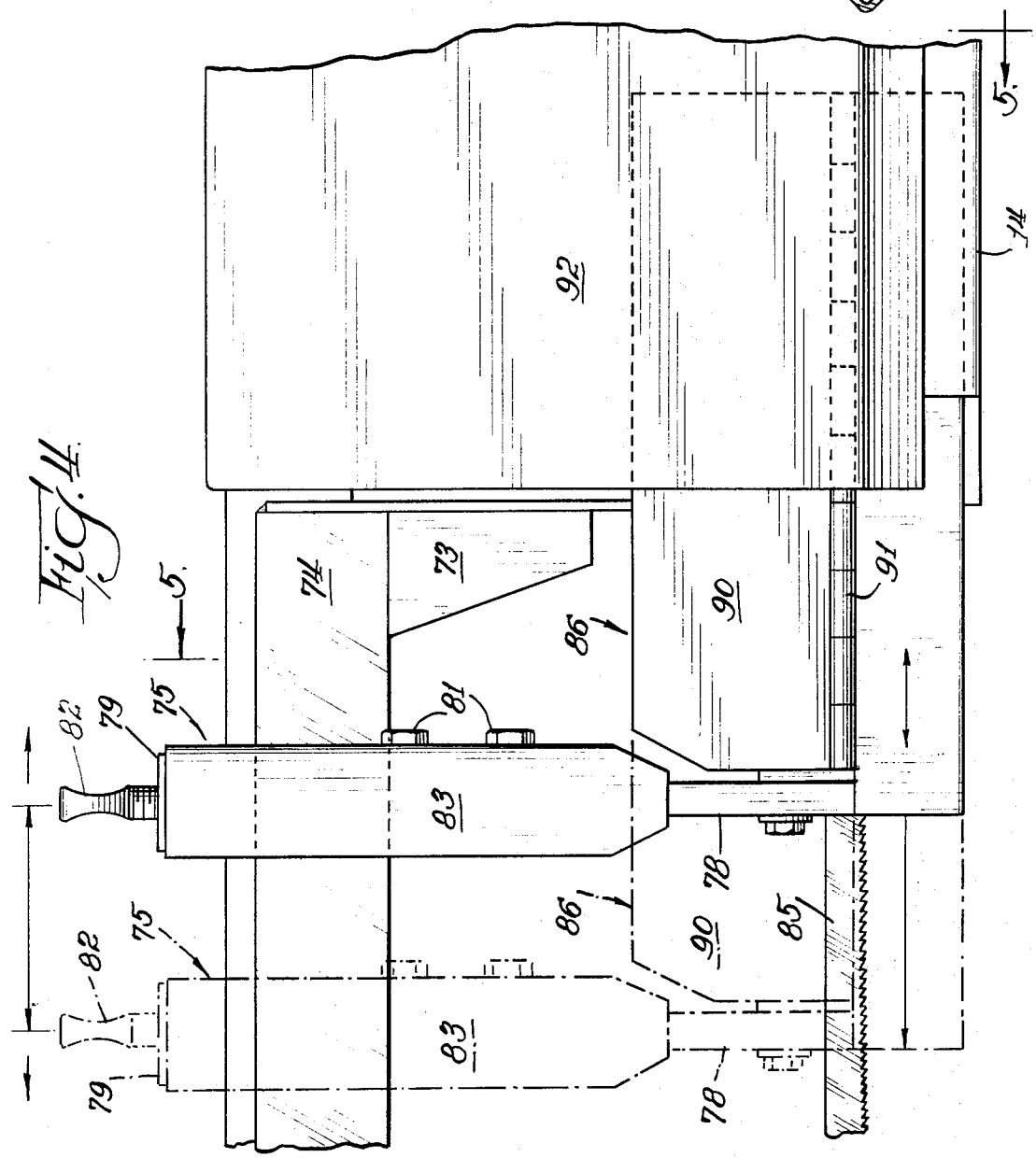

HORIZONTAL BAND SAW BLADE GUARD STRUCTURE

BACKGROUND OF THE INVENTION

The present invention relates to band saws, and is particularly concerned with a horizontal-type band saw having drive and support wheels mounted substantially at the same level, either horizontally or at an acute angle with respect to horizontal, and having blade guides for maintaining the portion of the blade engaging the workpiece to be maintained in vertical position. Additionally, guard housings are provided over the drive and support wheels to protect persons operating the saw.

PRIOR ART

Horizontal-type band saws having a saw blade mounted on drive and support wheels positioned at substantially the same level, either horizontal or at an acute angle with respect to the horizontal, and having vertical guides to maintain the blade in position are widely used. The spacing between the two vertical guides is adjustable to conform to the width of the workpiece, it being desirable to space the two blade guides as closely as possible while still permitting the workpiece to be inserted therebetween. It is customary to provide protective housings over the driving and support wheels and the rear portion of the band saw blade. However, because the blade guides must be moved back and forth in order to conform to the various sizes of workpieces, a fixed guard for the blade cannot be used. It is highly desirable to have a blade guard to prevent accidental contact by the operator, and also to protect the operator in case the band saw blade breaks, as occasionally occurs particularly when a strong force is utilized to apply the blade to the workpiece.

OBJECTS OF THE INVENTION

It is accordingly an object of the present invention to provide blade guards for a horizontal-type band saw for protecting the operator from accidental injury by the blade due to accidental contact. It is still further an object to provide blade guards of the type described which almost completely enclose portions of the blade disposed therein on both sides of the workpiece being cut. It is further an object to provide a blade guard so dimensioned and positioned with respect to the blade guides of the saw that the blade can be removed without dismantling the blade guards or blade guide. It is still further an object to provide a blade guard which moves with the blade guides when they are adjusted. It is an additional object to provide a blade guard of the type described which is relatively simple to fabricate and to mount on a conventional horizontal band saw. Still other objects will readily present themselves to one skilled in the art upon reference to the ensuing specification, the drawings, and the claims.

According to the invention, elongate blade guards are provided having an upwardly open channel and each affixed at one end to one of the blade guides. The saw blade is completely positioned within the channel defined by the side walls and bottom wall of the blade guards. The blade guards move with the guides during adjustment. The channels of the blade guides are so dimensioned that the blade can be slipped out of the blade guides, moved downwardly and forwardly between the guides and bottom walls of the guards, and then moved upwardly between the front walls of the guards and the guides, and removed from the apparatus without disassembling either the guides or the blade guards.

BRIEF DESCRIPTION OF THE DRAWINGS

In the drawings,

FIG. 1 is a perspective view of a horizontally positioned band saw having a blade guard according to the invention mounted thereon.

FIG. 2 is a fragmentary elevational view of the apparatus shown in FIG. 1.

FIG. 3 is a cross-sectional view taken at the line 3—3 of FIG. 2, looking in the direction of the arrows.

FIG. 4 is a fragmentary elevational view of another embodiment of the invention, and FIG. 5 is a cross-sectional view taken at the line 5—5 of FIG. 4, looking in the direction of the arrows.

DESCRIPTION OF THE PREFERRED EMBODIMENTS

Referring to FIGS. 1–3, a horizontal-type band saw assembly 10 is shown comprising a conventional table 11 for supporting machine tool equipment, and a pair of pedestal-type legs 12 and 13 mounted thereon supporting a machine base 14. Workpiece holders 15 and 16 are mounted on the machine base by means of bolts 17. A horizontal beam 18 is mounted on beam supports 19 and 20 which are in turn affixed to the machine base 14. Adjustable vertical blade guide assemblies 21 and 22 are adjustably mounted on the horizontal beam 18 and comprise, respectively, vertical beam members 23 and 24, upper clamp members 25 and 26 affixed to the beam members 23 and 24, respectively, lower clamp members 27 and 28 affixed to the beam members 23 and 24 by bolts, thumbscrews 29 for clamping the vertical blade guide arm assemblies 21 and 22 to the horizontal beam 18, and trim guards 30 and 31. Affixed to the bottom of guide arm assemblies 21 and 22 are roller guide assemblies 32 and 33 which are similar in structure. As shown particularly in FIGS. 2 and 3, the roller assembly 37 comprises a housing 34, a pair of bolt-type shafts 36 and 37, lateral guide rollers 38 and 39 mounted on the shafts, and a back-up roller 40 mounted on the shaft 37.

As further shown in FIG. 1, a blade drive wheel 43 is shown in broken lines rotatably mounted on the machine base, and powered by a motor 44 operating through a variable drive assembly 45, and having a pulley 46 mounted thereon, a pulley 47 connected to the drive wheel 43, and an endless flexible belt 48 mounted over the two pulleys. A drive wheel guard 49 is mounted over the drive wheel and affixed to the machine base.

A blade support wheel 50 is rotatably mounted on the machine base and is covered by a support wheel guard 51. An endless band saw blade 52 is mounted over the drive wheel 43 and the support wheel 50. A relatively narrow work support plate 56 is mounted on the machine base immediately below the saw blade 52.

A pair of channel- or trough-form blade guards 57 and 58 are affixed to the vertical beam members 23 and 24 by means of screws. The right blade guard 58, shown in FIG. 3, has a front wall or panel 59, a bottom wall or panel 60, and a rear wall or panel 61. The blade guards 57 and 58 are so positioned and spaced that the blade may be removed from its position between the lateral guide rollers, moved downwardly and forwardly to clear the front guide roller, and then upwardly through the space between the forward guide roller 38 and the front wall 59. If desired, the blade guards may be provided with a top wall 66 shown in broken lines and affixed to the rear wall 64. A small space or notch 67 is left intermediate the front wall 59 and the top wall 66 to permit the saw blade to pass therethrough when the blade is removed. As a result, it is not necessary to remove the blade guards from the vertical guides when removing or replacing the saw blade. As shown in FIG. 2 by broken lines, as the blade guide 22 is moved laterally, the blade guard 58 moves with the guide.

Referring to FIGS. 4 and 5, a modified embodiment is shown comprising beam supports 73 having a horizontal beam 74 mounted thereon at its ends. A right blade guide assembly 75 is shown mounted on the horizontal beam 74. A similar blade guide assembly, although not shown, is mounted to the left of the guide assembly 75 shown, and has a similar structure including lateral guide rollers and a back-up roller. The right blade guide assembly 75 is also provided with a roller assembly similar to that shown in FIG. 3. The blade guide assembly 75 comprises a vertical arm 78, an upper clamp member 79, and a lower clamp member 80 affixed to the vertical arm 78 by means of bolts 81. A thumbscrew 82 adjustably clamps the guide assembly 75 to the horizontal beam 74. A trim guard 83 is mounted on the vertical arm 78.

As shown in FIG. 5, a drive wheel 84 is rotatably mounted on the machine base and drive by a motor and variable drive through pulleys and a belt (not shown, but similar to that shown in FIG. 1). A saw blade 85 is mounted on the drive wheel, and also mounted on a support wheel (not shown) on the other side of the apparatus. A drive wheel guard 92 is mounted on the base 71. A blade support wheel guard is also mounted on the blade support wheel (not shown but similar to the structure of FIG. 1).

A blade guard 86 according to the invention is affixed at one end to the vertical arm 78 of the guide assembly 75. The other end of the blade guard 86 is telescoped within the drive wheel guard 92. The blade guard 86 comprises a rear wall 87 which is affixed to the vertical arm 78 by screws 93, a bottom wall 88, and a front wall 89. A top member 90 is mounted on the front wall 89 by means of a piano-type hinge 91.

In removing the saw blade for replacement or repair, the support wheel for the blade is loosened in conventional manner and the blade removed from the support and drive wheels. The blade is then lowered from the blade guide recesses such as the recess 95 shown in FIG. 3 until the blade engages the bottom wall 60. The blade is then moved forwardly until it reaches the forward wall 59. The blade is raised and withdrawn through the space between the blade guide and the forward wall 59. Where a top wall 66 is present as shown in FIG. 3, the blade is withdrawn through the space 67 between the edge of the top wall and the front wall 59. In the case of the embodiment shown in FIGS. 4 and 5, the hinged top wall 90 is opened forwardly providing removal space, and the blade is then removed over the end of the opened top wall.

Although the blade guard of the present invention has been shown as affixed to the blade guide assemblies and telescoped within the wheel guards in floating relationship, alternatively, the blade guard may have a slidable relationship with respect to the wheel guard or other parts of the housing as by spring rollers or screws and slots. Additionally, latching or fastening means may be provided to fasten the top wall 90 in place during operation. Moreover, although the blade guard has been shown and described in the form of a channel structure having flat sides and bottom, the bottom could alternatively be arcuate with the channel having a U-form cross-section. In such structure the channel should be so dimensioned that the blade can slide around the end of the blade guides for removal. Additionally, the blade guard may have a semi-circular, elliptical, or parabolic cross-section. Moreover, the guard may have a plurality of flat side walls to form a channel having a polygonal cross-section.

The blade guard of the present invention has many advantages. The guard provides positive protection from accidental encounter with the moving blade since the blade is positioned substantially entirely within the channel of the guard and surrounded on three sides. In the embodiment having a top wall, the blade is covered on all four sides. The guard is so designed that there is sufficient space between the saw blade guide and both the bottom and front wall of the guard so that a blade can be removed from the guide and from the guard without the need to disassemble or remove the guard. The blade guard is relatively simple and inexpensive to produce from readily available materials.

It is to be understood that the invention is not to be limited to the exact details of operation or structures shown and described, as obvious modifications and equivalents will be apparent to one skilled in the art.

I claim:

1. In a horizontal band saw, comprising in combination: a base, a work support platform mounted thereon, blade support and drive means having a saw blade mounted thereon, power means for driving said blade drive means, laterally adjustable vertically positioned blade guides mounted one on each side of said work support platform, and a saw blade mounted on said support means and drive means and engaged by recesses provided in said blade guides, the improvement comprising elongate blade guards each affixed at one end to one of said vertically positioned blade guides and movable therewith, said blade guards having side walls and a bottom wall defining an upwardly open channel having said saw blade disposed therein.

2. In a horizontal band saw according to claim 1, the improvement wherein said blade support means and blade drive means comprise wheels rotatably mounted on said base and having guards mounted over each of said wheels, said blade guards being arranged in telescoping relationship with respect to said wheel guards.

3. In a horizontal band saw according to claim 1, the improvement wherein the forwardmost side wall of each of said blade guards is sufficiently spaced from the blade guides on which said blade guards are mounted to permit said saw blade to be removed therefrom without requiring said blade guards to be removed.

4. In a horizontal band saw according to claim 1, the improvement wherein said blade guards additionally have top walls.

5. In a horizontal band saw according to claim 4, the improvement wherein said top walls are hingedly mounted on the side walls of said blade guards.

6. In a horizontal band saw according to claim 1, the improvement wherein the rear walls of said blade guards are affixed to the ends of said vertically positioned blade guides.

7. In a horizontal band saw according to claim 2, the improvement wherein the free ends of said blade guards are slidably supported in said wheel guards.

* * * * *